(12) United States Patent
Yu et al.

(10) Patent No.: US 7,963,447 B2
(45) Date of Patent: Jun. 21, 2011

(54) ENHANCED MONITORING OF LASER OUTPUT POWER IN ELECTRO-OPTICAL READERS

(75) Inventors: Ming Yu, South Setauket, NY (US); Rong Liu, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 872 days.

(21) Appl. No.: 11/998,555

(22) Filed: Nov. 30, 2007

(65) Prior Publication Data
US 2009/0140047 A1   Jun. 4, 2009

(51) Int. Cl.
*G06K 7/10* (2006.01)
(52) U.S. Cl. ........... 235/462.43; 235/454; 235/462.01; 235/462.45; 235/472.01
(58) Field of Classification Search .......... 235/454, 235/462.01, 462.25, 462.43, 462.45, 472.01, 235/462.26
See application file for complete search history.

(56) References Cited

U.S. PATENT DOCUMENTS

| 4,251,798 | A | 2/1981 | Swartz et al. |
| 5,561,283 | A | 10/1996 | Dvorkis et al. |
| 5,635,697 | A | 6/1997 | Shellhammer et al. |
| 6,060,722 | A | 5/2000 | Havens et al. |
| 7,267,283 | B2 * | 9/2007 | Schneider et al. ....... 235/472.01 |
| 7,296,743 | B2 * | 11/2007 | Giebel et al. .................. 235/454 |

* cited by examiner

*Primary Examiner* — Thien M. Le
*Assistant Examiner* — April A Taylor

(57) ABSTRACT

Laser power monitoring arrangements interrupt power to a laser used in electro-optical readers upon detection of operating conditions not conforming to preestablished standards. An auxiliary light detector independently monitors the output power of a laser beam, and directly receives a portion of the laser beam reflected from a diffractive optical lens surface of an optical assembly for optically modifying the laser beam, or from a coated or uncoated inclined surface of a split collimating lens of the optical assembly. The split collimating lens may have its lens portions in mutual contact or separated by an air gap.

16 Claims, 3 Drawing Sheets

ENHANCED MONITORING OF LASER OUTPUT POWER IN ELECTRO-OPTICAL READERS

BACKGROUND OF THE INVENTION

Optical codes or dataforms are patterns made up of image areas having different light-reflective or light-emissive properties, which are typically assembled in accordance with a priori rules. The optical properties and patterns of codes are selected to distinguish them in appearance from the background environments in which they are used. Electro-optical readers identify or extract data from codes and are used in both fixed or portable installations in many diverse environments such as in stores for check-out services, in manufacturing locations for work flow and inventory control, and in transport vehicles for tracking package handling. The code is used as a rapid, generalized means of data entry.

Many conventional readers are designed to read one-dimensional bar code symbols. The bar code symbol is a pattern of variable-width rectangular bars separated by fixed or variable width spaces. The bars and spaces have different light-reflecting characteristics. One example of a one-dimensional bar code symbol is the UPC/EAN code used to identify, for example, product inventory. An example of a two-dimensional or stacked bar code symbol is the PDF417 barcode, which is disclosed in U.S. Pat. No. 5,635,697.

Many conventional readers are handheld and generate one or more moving beams of laser light from a reading laser. The beams sweep one or more scan lines across a symbol that is located anywhere in a range of working distances from a reader. The reader obtains a continuous analog waveform corresponding to the light reflected or scattered from the symbol. The reader then decodes the waveform to extract information from the symbol. A reader of this general type is disclosed, for example, in U.S. Pat. No. 4,251,798. A reader for detecting and decoding one- and two-dimensional symbols is disclosed in U.S. Pat. No. 5,561,283.

Symbols can also be read by employing solid-state imagers in imaging readers, also often deployed in handheld housings. For example, an imager, akin to that used in a digital camera, may have a one- or two-dimensional array of cells or pixel sensors that correspond to image elements or pixels in a field of view of the imager. Such an imager may be a one- or two-dimensional charge coupled device (CCD) or a complementary metal oxide semiconductor (CMOS) device, and associated circuits for producing electronic signals corresponding to the one- or two-dimensional array of pixel information over the field of view.

Although generally satisfactory for its intended purpose, the use of an imaging reader is often frustrating, because an operator cannot tell whether the imager, or the handheld housing in which the imager is mounted, is aimed directly at the target symbol, which can be located anywhere within a range of working distances from the reader. Contrary to moving laser beam readers in which an operator can see the visible laser beam as at least one scan line on the symbol, the imager is a passive unit and provides no visual feedback to the operator to advise where the imager is aimed. To alleviate such problems, the prior art proposed, for example, in U.S. Pat. No. 6,060,722 an aiming light pattern generator in an imaging reader, for generating and projecting an aiming light pattern from a light source, such as an aiming laser, on the symbol prior to reading.

Reading performance is a function of many factors, one of which is power output of the reading laser. Reading performance in moving laser beam readers is enhanced when the reading laser power output is increased. Yet, stringent safety standards, especially relating to eye safety concerns, dictate the maximum power output of the reading laser. Also, moving laser beam reader malfunction such as failure of the reading laser must be reliably monitored.

Aiming performance is also a function of many factors, one of which is also power output of the laser. Aiming performance in imaging readers is enhanced when the aiming laser power output is increased. More particularly, the visibility of the aiming light pattern is more pronounced, for both indoor and outdoor lighting environments, as the aiming laser power output is increased. Yet, stringent safety standards, also especially relating to eye safety concerns, dictate the maximum power output of the aiming laser. Also, imaging reader malfunction such as failure of the aiming laser must be reliably monitored.

SUMMARY OF THE INVENTION

One feature of the present invention resides, briefly stated, in a laser power monitoring arrangement in electro-optical readers for, and methods of, reading indicia, such as bar code symbols, by generating a laser beam with a laser, preferably a laser diode, having an output power, by optically modifying the laser beam with an optical assembly spaced from the laser along an optical axis, by detecting the output power of the laser beam with a light detector, preferably an auxiliary photodiode, spaced transversely of the optical axis away from the laser and the optical assembly, and by directly receiving a portion of the laser beam reflected from the optical assembly with the light detector.

The direct reception of the portion of the laser beam enhances detection and monitoring of the output power of the laser. Signal reception at the detector is stronger and more consistent than heretofore. In the case of a moving laser beam reader where the laser is employed for reading the symbol, and where the detector is employed in a control circuit for detecting reading laser malfunction, the enhanced signal reception at the detector enables the reading laser to be configured to emit more power to more closely approach established maximum safety standards, because of the increased safety and reliability afforded by the control circuit. More reading laser output power signifies better reading performance, for example, the range of working distances in which the symbol can be read is extended.

In the case of an imaging reader where the laser is employed for aiming at the symbol prior to reading, and where the detector is employed in a control circuit for controlling the output power of the aiming laser, the enhanced signal reception at the detector enables the aiming laser to be configured to emit more power to more closely approach established maximum safety standards. More aiming laser output power signifies better reading performance, for example, the visibility of an aiming light pattern projected by the aiming laser is more pronounced.

The optical assembly includes a collimating lens for collimating the laser beam. The laser diode and the collimating lens are mounted axially adjacent each other along the optical axis. The collimating lens is split along inclined surfaces that, in one embodiment, are in surface area contact with each other and inclined relative to the optical axis. The portion of the laser beam emitted by the laser diode is reflected off one or both of the inclined surfaces directly to the auxiliary photodiode. A reflective coating is advantageously provided on the one or both of the inclined surfaces, for directly reflecting the portion of the laser beam incident on the coating directly to the auxiliary photodiode. In another embodiment, the collimating lens is split along inclined surfaces that are separated by an air gap along, and inclined relative to, the optical axis. The portion of the laser beam emitted by the laser diode is reflected off one or both of the inclined surfaces directly to the auxiliary photodiode.

In still another embodiment, the collimating lens has a diffractive optical element surface for directly reflecting the portion of the laser beam incident on the diffractive optical element surface directly to the auxiliary photodiode.

In a preferred embodiment, the auxiliary photodiode is mounted, preferably surface-mounted, on a printed circuit board, preferably at a location between the laser and the optical assembly. An enclosure advantageously surrounds the auxiliary photodiode to prevent stray light from entering the auxiliary photodiode.

The laser power monitoring method of reading indicia according to this invention is performed by generating a laser beam with a laser having an output power, by optically modifying the laser beam with an optical assembly spaced from the laser along an optical axis, by detecting the output power of the laser beam with a light detector spaced transversely of the optical axis away from the laser and the optical assembly, and by directly receiving a portion of the laser beam reflected from the optical assembly.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
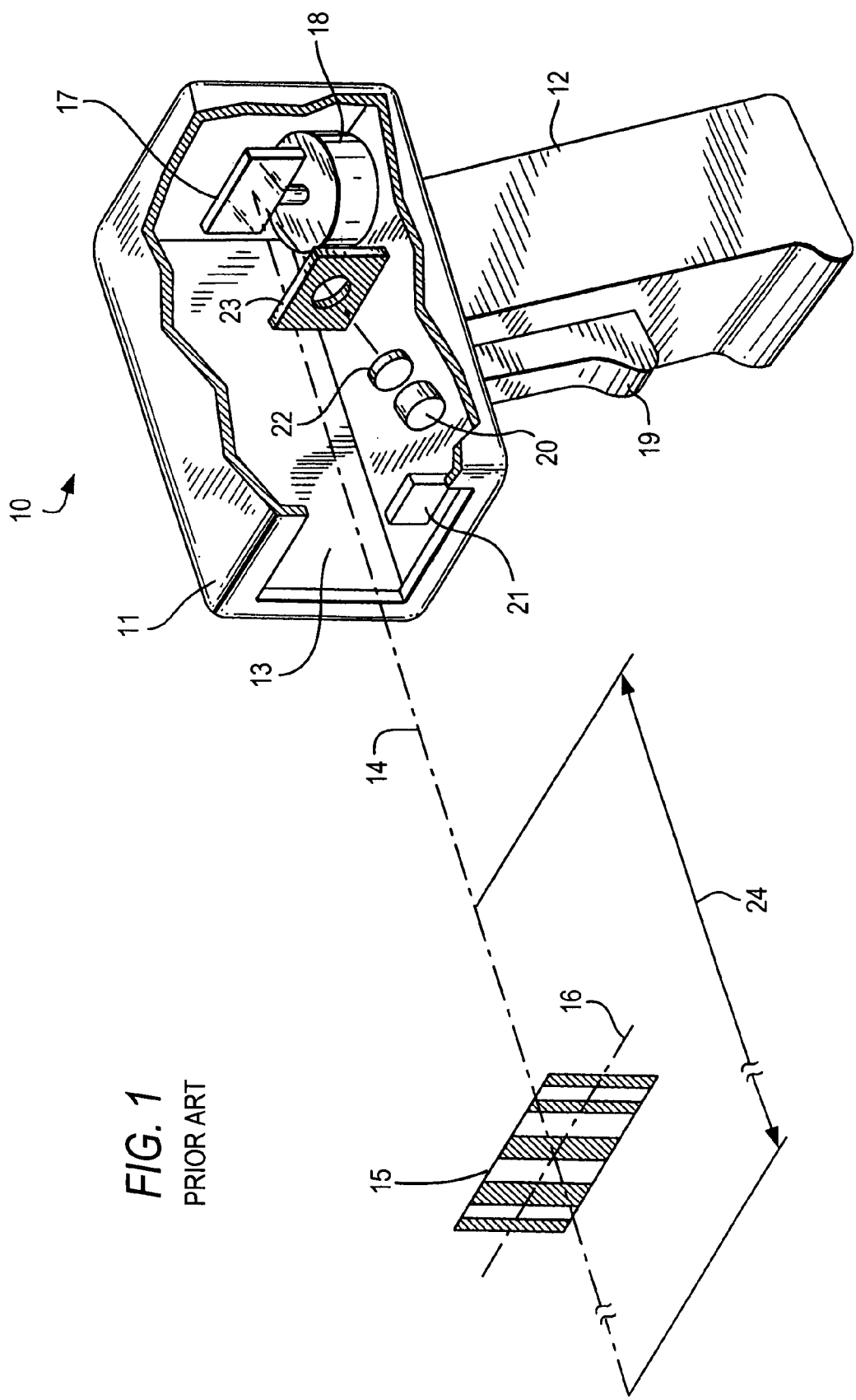
FIG. 1 is a perspective view of a moving laser beam electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia that may be recognized or identified as a representation of variations in light reflectivity at various points of the pattern or indicia. FIG. 1 shows an indicium 15 as one example of a "symbol" to be read. The term "target" broadly encompasses any one- or two-dimensional symbol, as well as any other object to be imaged, including non-symbols, documents, people, etc.

FIG. 1 depicts a known handheld moving laser beam reader 10 for reading symbols. The reader 10 includes a housing having a barrel portion 11 and a handle 12. Although the drawing depicts a handheld pistol-shaped housing, the invention may also be implemented in other types of housings such as a desktop workstation or a stationary reader. In the illustrated embodiment, the barrel portion 11 of the housing includes an exit port or window 13 through which an outgoing laser light beam 14 passes to impinge on, and sweep across, the bar code symbol 15 located in a range 24 of working distances from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or the like permit an operator to initiate the scanning operation when the operator holds and aims the reader 10 at the symbol 15.

The reader 10 includes a reading laser 20 mounted within the housing. The reading laser 20 generates the laser beam 14. A photodetector 21 is positioned within the housing to collect at least a portion of the light reflected and/or scattered from the symbol 15. The photodetector 21, as shown, faces toward the window 13 and has a static, wide field of view characteristic of a non-retro-reflective reader. Alternatively, in a retro-reflective reader, a convex portion of the scan mirror 17 may focus collected light on the photodetector 21, in which case, the photodetector faces toward the scan mirror. As the beam 14 sweeps the symbol 15, the photodetector 21 detects the light reflected and/or scattered from the symbol 15 and creates an analog electrical signal proportional to the intensity of the collected light.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to a specific symbology to derive a binary representation of the data encoded in the symbol, and the alphanumeric characters represented by the symbol.

The reading laser 20 directs the laser beam through an optical assembly comprising a focusing lens 22 and preferably an aperture stop 23, to optically modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the reader 10, the operator depresses trigger 19, which activates the reading laser 20 and the motor 18. The reading laser 20 generates the laser beam that passes through the lens 22 and the aperture 23. The lens 22 and the aperture 23 modify the beam to create an intense beam spot of a given size that extends continuously and does not vary substantially over the range 24 of working distances. The lens and the aperture direct the beam onto the mirror 17, which directs the modified laser beam outwardly from the scanner housing 11 and toward the symbol 15 in a sweeping pattern, i.e., along scan line 16. The symbol 15, placed at any point within the working distance range 24 and substantially normal to the laser beam 14, reflects and/or scatters a portion of the laser light. The photodetector 21, shown mounted in the scanner housing 11 in a non-retro-reflective position, detects the reflected and/or scattered light and converts the received light into an analog electrical signal. The photodetector could also be mounted in a retro-reflective position facing the scan mirror 17. The system circuitry then converts the analog signal to a pulse width modulated digital signal that a microprocessor-based decoder decodes according to rules of the symbology of the type of symbol being read.

Figure 2:
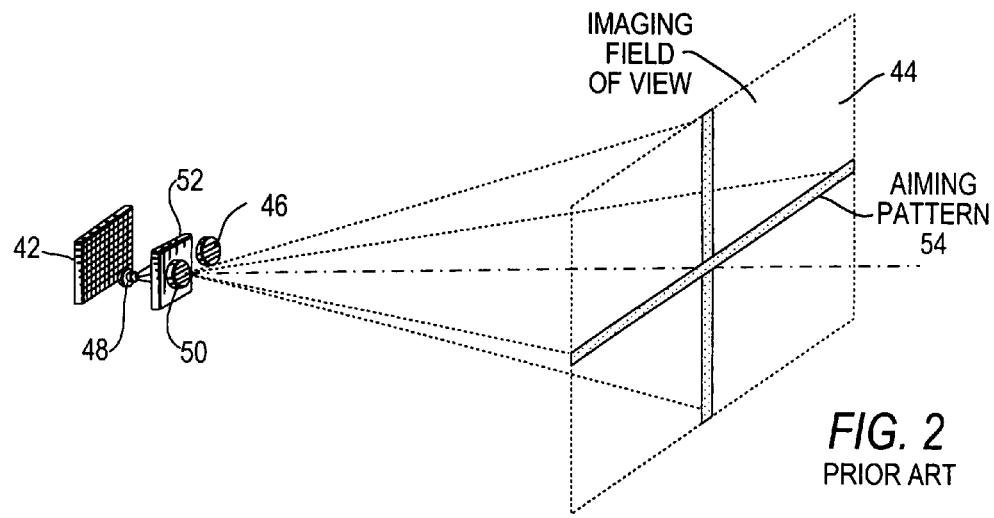
FIG. 2 is a perspective view of an imaging electro-optical reader in accordance with the prior art.

As shown in a known imaging reader depicted in FIG. 2, an imager 42 having an array of cells or pixel sensors, each having one or more photosensors, is operative for converting return light from a target into electrical signals corresponding to a two-dimensional array of pixel information for processing into an image. A suitable imager is disclosed in U.S. Pat. No. 5,965,875. In operation, a field of view 44 is imaged by the imager 42. More particularly, the return light from a target (not illustrated) in the field of view passes through an imaging lens 46 that captures and focuses the light onto a receiving surface of the imager.

In order to aim the imager 42 at the target prior to reading, an aiming system is provided. The aiming system includes an aiming laser 48, an optical component 50, and preferably an aperture stop 52. The aiming laser 48 generates a laser beam that diverges until it passes through the aperture stop 52, in which the beam is optically modified to have a predetermined cross-section. Thereupon, the laser beam passes through the optical component 50, in which the beam is focused, collimated, and optically modified to generate a visible, aiming light pattern 54 comprising mutually perpendicular aiming lines on the target, thereby assisting an operator in aiming the imager 42 at the target. Other aiming light patterns are contemplated.

The optical component 50 may be a diffractive optical element (DOE), a holographic element, or a Fresnel element, which generates a light interference pattern useful for framing the field of view. It is also known to use non-interferometric optical components to project an aiming line as described in U.S. Pat. No. 6,069,748, which disclosed the use of a toroidal lens to project a single aiming line. U.S. Pat. No. 7,182,260 disclosed the use of a refractive optical element (ROE) having a plurality of refractive structures to generate an aiming light pattern on a symbol for framing the field of view of an imager.

Figure 3:
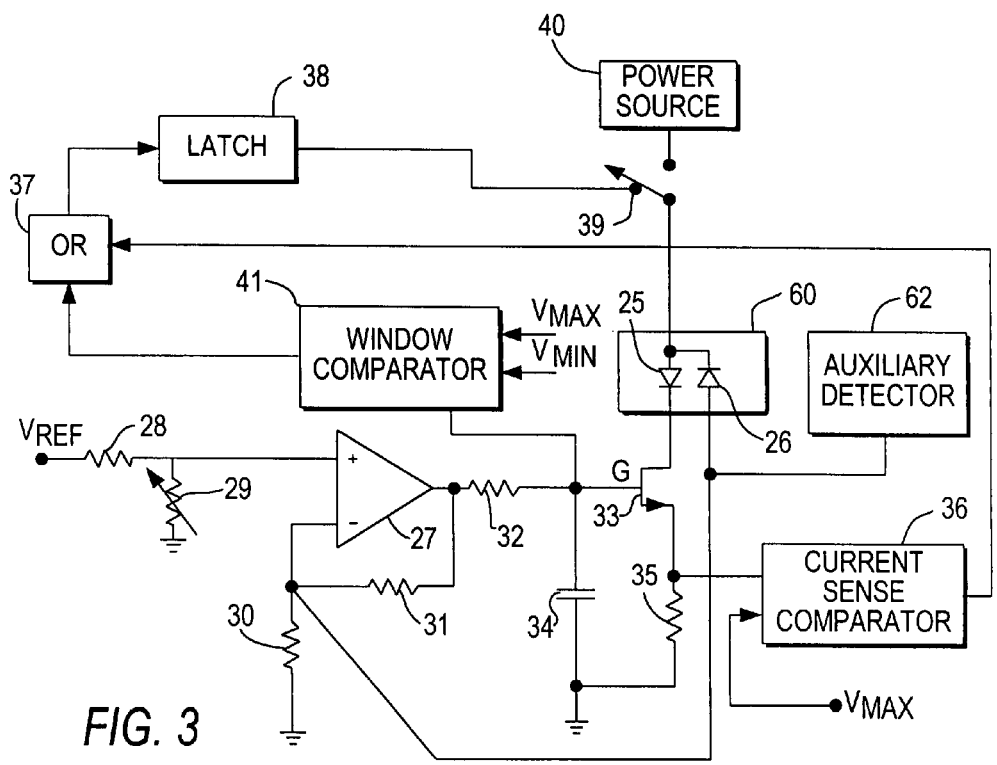
FIG. 3 is a circuit schematic depicting a laser power control circuit in accordance with the present invention especially useful in the readers of FIGS. 1-2.

FIG. 3 depicts a laser 60 that is intended to represent either the reading laser 20 of FIG. 1 or the aiming laser 48 of FIG. 2. The laser 60 includes a housing, a laser diode 25 in the housing, and a monitor photodiode 26 in the housing and operative for monitoring the output power of the diode 25. The monitor photodiode 26 is positioned behind a rear facet of the laser diode 25 to monitor the output power level. The monitor photodiode 26 is part of a feedback control circuit operative for maintaining the laser output power constant. The feedback circuit includes a comparator 27 having a reference voltage applied to a positive input of the comparator through a voltage divider comprised of resistors 28, 29. The monitor photodiode 26 is connected to a negative input of the comparator via a resistive network including resistors 30, 31. The output of the comparator 27 is conducted through a resistor 32 and capacitor 34 to a gate G of a field effect transistor (FET) 33. The drain output of the FET 33 is connected to the laser diode 25. The source output of the device 33 is connected to ground through a current sense resistor 35.

The control circuit of FIG. 3 is conventional in that the monitor photodiode 26 detects changes in output power of the laser beam emitted by the laser diode 25 and sends a feedback signal to the comparator 27 for driving the FET 33 to allow more or less current to pass through the current sense resistor 35 and, in turn, through the laser diode 25. The greater this current, the greater the laser output power, and vice versa.

A current sense comparator 36 has one input connected to the current sense resistor 35 to monitor the current flowing therethrough, and another input connected to a reference voltage that corresponds to the maximum current allowable through the resistor 35. The output of the comparator 36 is connected to an OR gate 37 which, in turn, is connected to a latch 38 and a switch 39, which is connected between a power supply 40 and the laser diode 25. If the comparator 36 senses that the current passing through the resistor 35 exceeds a maximum preestablished value, then an output control signal is conducted to the gate 37 and, in turn, to the latch 38 for opening the switch 39 to remove the power source 40 from energizing the laser diode 25.

In further accordance with FIG. 3, a window comparator 41 is connected to the resistor 32 and monitors the voltage being applied to the gate G of the FET 33. A maximum gate voltage and a minimum gate voltage are also applied to the window comparator 41. The comparator 41 is, in turn, connected to the OR gate 37. If the comparator 41 senses that the gate voltage being applied to the gate G is greater than the preestablished maximum gate voltage, or is less than the preestablished minimum gate voltage, then a signal is sent to the OR gate 37 to operate the latch 38 and open the switch 39, thereby deenergizing the laser diode. Thus, power is removed from the laser diode 25 in the event of malfunction or failure of the monitor photodiode 26, the FET 33, the comparator 27, the laser diode 25, or any circuit connection.

More specifically, the FIG. 3 circuit removes the power source 40 from the laser 60 after detecting an out-of-range condition in the error amplifier 27 that controls the output power of the laser. This circuit will remove power from the laser 60 under at least one of the following conditions: a failure of the device 33 in the output of the laser drive causes excess current to flow through the laser, thereby causing the laser output to exceed the factory set limit; the monitor diode 26 connection is lost due to a device 33 failure or a circuit connection failure; or, the laser fails and the laser drive current significantly increases as resistor 35 is used to sense a high current drive condition. Advantageously, a timer could be added to the FIG. 3 circuit to remove power only when a malfunction persists for a predetermined time.

Figure 4:
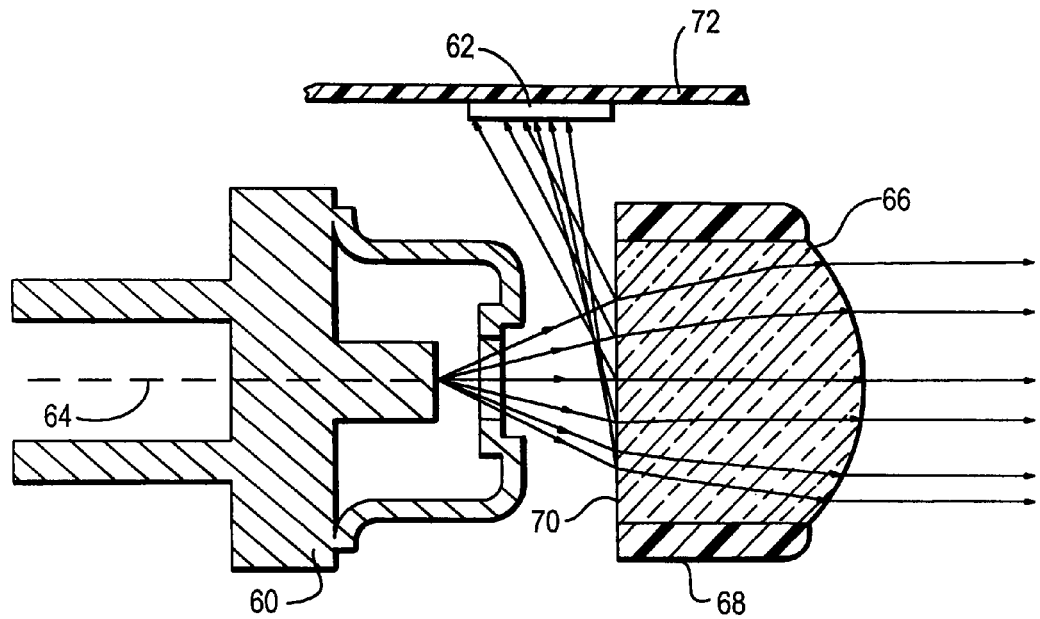
FIG. 4 is an enlarged view of one embodiment of a laser power monitoring arrangement in accordance with the present invention.
Figure 5:
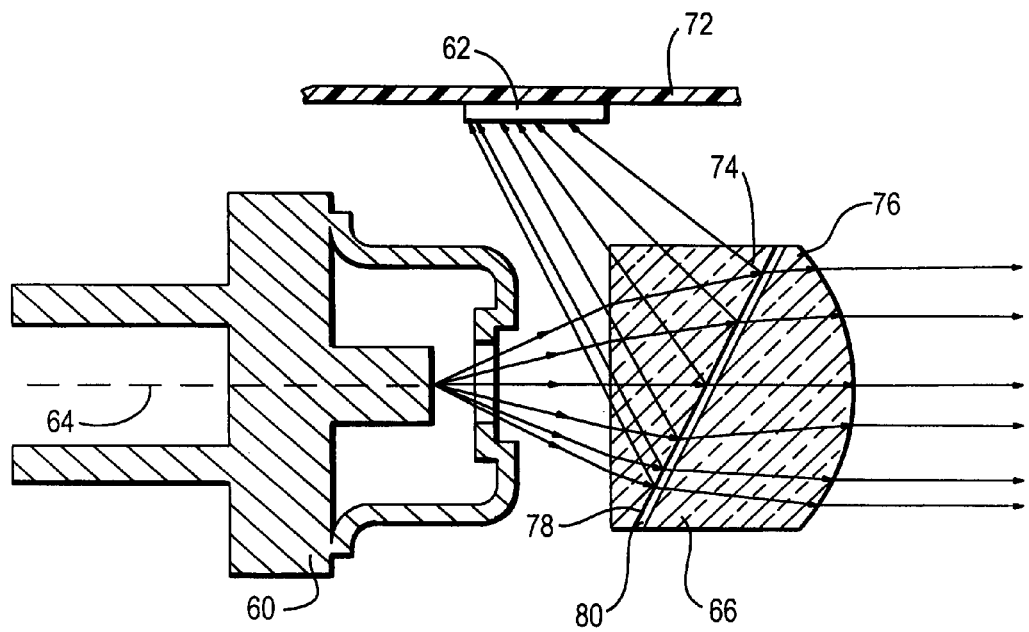
FIG. 5 is a view analogous to FIG. 4 of another embodiment of a laser power monitoring arrangement in accordance with the present invention.

In addition to the monitor photodiode 26, an auxiliary detector 62, preferably a photodiode, is used to independently monitor the output power of the laser 60, using the same control circuit depicted in FIG. 3. As shown in the embodiments of FIGS. 4 and 5, the auxiliary detector 62 is not mounted within the housing of the laser 60, but is mounted outside the housing. The monitor photodiode 26 is not shown in FIGS. 4 and 5.

As shown in FIGS. 4 and 5, the laser 60, preferably a laser diode, emits a laser beam having an output power, and an optical assembly is axially spaced from the laser 60 along an optical axis 64, for optically modifying the laser beam. The optical assembly includes a collimating lens 66 for collimating the laser beam. A holder 68 may be employed for holding the collimating lens 66.

The auxiliary detector 62 is spaced transversely of, and away from, the optical axis 64 away from, and advantageously between, the laser 60 and the optical assembly, for detecting the output power of the laser beam. The auxiliary detector 62 is mounted, preferably surface-mounted, on a printed circuit board 72 lying in a plane generally parallel to the optical axis 64. An enclosure may surround the auxiliary detector 62 to prevent stray light from entering the auxiliary detector 62. The auxiliary detector 62 is operative for directly receiving a portion of the laser beam reflected from the optical assembly.

As shown in FIG. 4, the collimating lens 66 is a DOE having a diffractive optical element surface 70 for directly reflecting the portion of the laser beam incident on the diffractive optical element surface 70 directly to the auxiliary photodiode 62.

As shown in FIG. 5, the collimating lens 66 is split along inclined surfaces into a pair of lens portions 74, 76. In one embodiment, the lens portions 74, 76 are in surface area contact with each other, and the inclined surfaces are inclined relative to the optical axis 64. The portion of the laser beam emitted by the laser diode 60 is reflected off one or both of the inclined surfaces directly to the auxiliary photodiode 62. A reflective coating 78 is advantageously provided on one or both of the inclined surfaces, for directly reflecting the portion of the laser beam incident on the coating 78 directly to the auxiliary photodiode 62. In another embodiment, the lens portions 74, 76 are separated by an air gap 80 along, and inclined relative to, the optical axis 64. The portion of the laser beam emitted by the laser diode 60 is reflected off one or both of the inclined surfaces directly to the auxiliary photodiode 62 in an effect known as frustrated total internal reflection (FTIR).

In the embodiments of FIGS. 4 and 5, the additional light detected by the auxiliary detector 62, is monitored and processed by the control circuit of FIG. 3 to generate a control signal used to open the switch 39 when the laser output power does not meet a preestablished value. This feature promotes safety in the use of a moving beam reader and an imaging reader in each of which a laser is used.

The direct reception of the portion of the laser beam enhances detection and monitoring of the output power of the laser 60. Signal reception at the detector 62 is stronger and more consistent than heretofore. In the case of a moving laser beam reader where the laser 20 is employed for reading the symbol, and where the detector is employed in a control circuit for detecting reading laser malfunction, the enhanced signal reception at the detector enables the reading laser 20 to be configured to emit more power to more closely approach established maximum safety standards, because of the increased safety and reliability afforded by the control circuit. More reading laser output power signifies better reading performance, for example, the range of working distances in which the symbol can be read is extended.

In the case of an imaging reader where the laser 48 is employed for aiming at the symbol prior to reading, and where the detector is employed in a control circuit for controlling the output power of the aiming laser, the enhanced signal reception at the detector 62 enables the aiming laser 48 to be configured to emit more power to more closely approach established maximum safety standards. More aiming laser output power signifies better reading performance, for example, the visibility of an aiming light pattern projected by the aiming laser 48 is more pronounced.

It will be understood that each of the elements described above, or two or more together, also may find a useful application in other types of constructions differing from the types described above.

While the invention has been illustrated and described as embodied in laser power monitoring arrangements in electro-optical readers, it is not intended to be limited to the details shown, since various modifications and structural changes may be made without departing in any way from the spirit of the present invention.

Although described in connection with moving beam readers and imaging readers, this invention is also useful in laser projection displays and, in general, any system in which a laser is used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A laser power monitoring arrangement in an electro-optical reader for reading indicia, comprising:
   a laser for generating a laser beam having an output power;
   an optical assembly spaced from the laser along an optical axis, for optically modifying the laser beam;
   a light detector spaced transversely of the optical axis away from the laser and the optical assembly, for detecting the output power of the laser beam, the light detector being operative for directly receiving a portion of the laser beam reflected from the optical assembly;
   wherein the laser is a laser diode, and wherein the light detector is an auxiliary photodiode;
   wherein the optical assembly includes a collimating lens for collimating the laser beam, and wherein the laser diode and the collimating lens are mounted axially adjacent each other along the optical axis; and
   wherein the collimating lens is split along inclined surfaces and inclined relative to the optical axis, and wherein the portion of the laser beam emitted by the laser diode is reflected off one of the inclined surfaces directly to the auxiliary photodiode.

2. The arrangement of claim 1, and a control circuit for controlling the output power of the laser beam upon detection of a change in the output power of the laser beam by the light detector.

3. The arrangement of claim 1, and further comprising a printed circuit board on which the auxiliary photodiode is mounted.

4. The arrangement of claim 1, wherein the inclined surfaces are in surface area contact with each other.

5. The arrangement of claim 4, and a reflective coating on the one of the inclined surfaces, for directly reflecting the portion of the laser beam incident on the coating directly to the auxiliary photodiode.

6. The arrangement of claim 1, wherein the inclined surfaces are separated by an air gap along.

7. The arrangement of claim 1, and a scanner for sweeping the laser beam across the indicia to be read.

8. The arrangement of claim 1, wherein the laser is an aiming laser for projecting an aiming light pattern over the indicia prior to being read.

9. A laser power monitoring method in an electro-optical reader for reading indicia, comprising the steps of:
   generating a laser beam with a laser having an output power;
   optically modifying the laser beam with an optical assembly spaced from the laser along an optical axis;
   detecting the output power of the laser beam with a light detector spaced transversely of the optical axis away from the laser and the optical assembly, by directly receiving a portion of the laser beam reflected from the optical assembly;
   configuring the laser as a laser diode, and configuring the light detector as an auxiliary photodiode;
   collimating the laser beam with a collimating lens, and mounting the laser diode and the collimating lens axially adjacent each other along the optical axis; and splitting the collimating lens along inclined surfaces relative to the optical axis, and directly reflecting the portion of the laser beam emitted by the laser diode off one of the inclined surfaces directly to the auxiliary photodiode.

10. The method of claim 9, and controlling the output power of the laser beam upon detection of a change in the output power of the laser beam by the light detector.

11. The method of claim 9, and further comprising mounting the auxiliary photodiode on a printed circuit board.

12. The method of claim 9, and splitting the collimating lens along inclined surfaces in surface area contact with each other.

13. The method of claim 12, and applying a reflective coating on the one of the inclined surfaces, and directly reflecting the portion of the laser beam incident on the coating directly to the auxiliary photodiode.

14. The method of claim 9, and splitting the collimating lens along inclined surfaces separated by an air gap along.

15. The method of claim 9, and sweeping the laser beam across the indicia to be read.

16. The method of claim 9, and projecting an aiming light pattern over the indicia prior to being read.

* * * * *